United States Patent [19]

Ito et al.

[11] Patent Number: 4,528,105

[45] Date of Patent: Jul. 9, 1985

[54] MICELLE SOLUTION COMPOSITIONS FOR RECOVERING CRUDE OIL

[75] Inventors: Hiroshi Ito, Hino; Kyusei Hasegawa, Sagamihara; Takashi Takeuchi, Utsunomiya; Takayuki Ikenaga, Wakayama, all of Japan

[73] Assignees: Teikoku Oil Co., Ltd.; Kao Corporation, both of Tokyo, Japan

[21] Appl. No.: 525,897

[22] Filed: Aug. 24, 1983

[30] Foreign Application Priority Data

Sep. 7, 1982 [JP] Japan ................... 57-155726

[51] Int. Cl.$^3$ .................. E21B 43/22; E21B 43/24
[52] U.S. Cl. .................. 252/8.55 D; 166/275
[58] Field of Search ............. 252/8.55 D; 166/274, 166/275

[56] References Cited

U.S. PATENT DOCUMENTS

| | | | |
|---|---|---|---|
| 3,811,504 | 5/1974 | Flournoy et al. | 252/8.55 D |
| 3,811,505 | 5/1974 | Flournoy et al. | 252/8.55 D |
| 3,827,497 | 8/1974 | Dycus et al. | 166/275 |
| 4,059,154 | 11/1977 | Braden et al. | 252/8.55 D |
| 4,110,229 | 8/1978 | Carlin et al. | 166/275 |
| 4,124,073 | 11/1978 | Wier | 252/8.55 D |
| 4,146,499 | 3/1979 | Rosano | 252/8.55 D |
| 4,340,492 | 7/1982 | Stournas | 166/275 |

*Primary Examiner*—Maria Parrish Tungol
*Attorney, Agent, or Firm*—Oblon, Fisher, Spivak, McClelland & Maier

[57] ABSTRACT

A stable micelle solution composition for recovering crude oil, which can form a homogeneous micro emulsion against brines in a wide range of salt concentrations.

In a micelle solution composition comprising a hydrocarbon, brine, and a surface active agent, the above stated stable micelle solution composition can be obtained by specifying the surface active agent to be a mixture of (a) an ethylene oxide and propylene oxide block polymer, (b) an alkylbenzenesulfonate, (c) a polyoxyethylene alkyl ether sulfate or polyoxyethylene alkylphenol ether sulfate, and (d) a polyoxyethylene nonionic surface active agent other than the agent specified in (a).

14 Claims, No Drawings

MICELLE SOLUTION COMPOSITIONS FOR RECOVERING CRUDE OIL

BACKGROUND OF THE INVENTION

1. Field of the Invention

This invention relates to the recovery of crude oil and more particularly, to a stable micelle solution composition for recovering crude oil which can form a homogeneous micro emulsion over a wide range of salt concentration of an aqueous inorganic salt solution.

2. Description of the Prior Art

A micro emulsion flooding to which attention has been recently paid as one of effective processes of recovering crude oil from oil reservoirs in strata is a method utilizing micelle solutions. In the method, hydrocarbons such as a compounded oil, water, and surface active agents are mixed to form a micro emulsion and this emulsion is charged into oil reservoir to cause the interfacial tension to be lowered between crude oil and water. As a result, the crude oil becomes soluble and thus ready for recovery. This method has the advantage of high recovery efficiency, so that many studies have been made in recent years.

In the micro emulsion flooding, it is the usual practice to use petroleum sulfonates as the surface active agent. On the other hand, for recovery of crude oil in oil fields, sea water or brine containing inorganic salts mainly composed of sodium chloride substantially at the same level as sea water is frequently used, so that there is a demand of micelle solution compositions which are stable against highly concentrated salt solutions. Several methods have been proposed in which petroleum sulfonates are used with or without addition of other types of surface active agents or other aids.

However, in case where a micelle solution is prepared using brine such as salt-containing sea water as injection water, micro emulsion is formed only at a certain salt concentration when petroleum sulfonate is used. Accordingly, there has been adopted a method in which petroleum sulfonates of different average molecular weights are mixed depending on the salt concentration of brine, i.e. a mixture of petroleum sulfonates suitable for a given concentration of salt is provided. However, this method is disadvantageous in that the range of mixing of the petroleum sulfonates which should be varied depending on the concentration of salt in brine is very narrow. Rather, there arises the problem that it is necessary to prepare a brine having a given salt concentration suitable for an employed petroleum sulfonate by adding salt to the brine to adjust its salt concentration. It has been frequently experienced that many oil fields dictate use of sea water or oil reservoir water of high salt concentration. Accordingly, it is highly demanded to develop micelle solution compositions which can readily form micro-emulsions stable against various types of brines whose salt concentration is from as small as about 0.01% to higher than 20% and which cover a wide range of optimum salt concentrations.

SUMMARY OF THE INVENTION

Under these circumstances, we have made extensive studies to develop micelle solution compositions which overcome the drawbacks of the above prior art and which can yield stable micro emulsions against brines in a wide range of salt concentration. As a result, it was found that micelle solution compositions obtained by using the specific type of surface active agent met the above requirement.

According to the present invention, there is provided a micelle solution composition for recovering crude oil from petroleum reservoirs which comprises, in combination, a hydrocarbon, a brine, and a surface active agent, the surface active agent being a mixture of (a) an ethylene oxide and propylene oxide block polymer, (b) an alkylbenzenesulfonate, (c) a polyoxyethylene alkyl ether sulfate or polyoxyethylene alkylphenol ether sulfate, and (d) a polyoxyethylene nonionic surface active agent other than the agent specified in (a).

DETAILED DESCRIPTION OF THE INVENTION AND PREFERRED EMBODIMENTS

The ethylene oxide and propylene oxide block polymer of component (a) of the surface active agent used in the present invention is a block polymer obtained by adding propylene oxide and ethylene oxide to polyols, polyamines, or amino-alcohols. Examples of the polyols include polyhydric alcohols such as polypropylene glycol, glycerine, pentaerythritol, sorbitol and the like, monosaccharides and polysaccharides such as glucose, sucrose and the like; and examples of the polyamines include ethylenediamine, diethylenetriamine, pentaethylenehexamine, polyethyleneimine and the like. Examples of the amino-alcohols include mono-, di- or tri-ethanolamine, and the like.

The block polymer is an adduct of 20 to 100 moles of propylene oxide and ethylene oxide as a block per one active hydrogen. The content of ethylene oxide is in the range of 10 to 75 wt % of the total weight. The molecular weight of the block polymer is generally in the range of 1,000 to 200,000, preferably 2,000 to 8,000.

The alkylbenzenesulfonates of component (b) are alkaline earth metal salts, e.g. calcium, magnesium and barium salts, of alkylbenzenesulfonic acid having a linear or branched alkyl group containing 8 to 20 carbon atoms.

The polyoxyethylene alkyl ether sulfates or polyoxyethylene alkyl phenol ether sulfates of component (c) are compounds represented by the following formula:

$$R-O(CH_2CH_2O)_n-SO_3X$$

in which R represents an alkyl group having 8 to 22 carbon atoms or a phenyl group substituted with an alkyl group having 4 to 18 carbon atoms, n is a value of 2 to 100 on average, and X represents an alkali metal, or an ammonium or triethanolammonium (radical).

The polyoxyethylene nonionic active agents of component (d) other than (a) are, for example, polyoxyethylene alkyl ethers having an average number of addition moles of ethylene oxide ranging from 2 to 100 and the number of carbon atoms in the alkyl moiety ranging from 8 to 22 (hereinafter referred to simply as POE ($\overline{P}=2$ to 100) alkyl (C=8 to 22) ether), POE ($\overline{P}=2$ to 100) alkyl (C=4 to 18) phenol ether, fatty acid (C=8 to 22) POE adducts ($\overline{P}=2$ to 100), POE ($\overline{P}=2$ to 100) alkyl (C=8 to 22) amines, POE ($\overline{P}=3$ to 100) sorbitan fatty acid (C=8 to 22) ester, POE ($\overline{P}=2$ to 100) fatty acid (C=8 to 22) amides, and the like. Of these, polyoxyethylene alkyl ether or polyoxyethylene alkyl phenol ether nonionic surface active agents such as, for example, polyoxyethylene ($\overline{P}=5$ to 20) nonyl phenol ether (commercial name: Emulgen-906, 909, 910, 911, 913 and 920, by Kao Corporation) are preferable.

The micelle solution of the invention comprises as essential components, a hydrocarbon, a brine, and the above-described four components (a) through (d). Use of the four components permits a wider usable range of salt concentration in a given composition. Suitable choice of component (a) results in a stable micelle solution using a brine which has a very wide range of salt concentration.

Although the reason for this is not clearly known, it is considered as follows: the polyoxyethylenepolyoxypropylene block polymer of component (a) serves as a matrix; oil-soluble component (b) is arranged by orientation with the oleophilic polyoxypropylene groups of the block polymer; the hydrophilic property is augmented by component (c); and thus the surface active agent renders hydrocarbons very soluble as a whole and produces great affinity for brine.

When only three components (a), (b) and (c) are used, they are kept as a turbid macro emulsion in brine and are apt to separate. However, when component (d) is further added, a transparent micro emulsion is obtained, thereby giving a thermodynamically stable micelle solution.

The micelle solution of the present invention can be prepared by adding a hydrocarbon to a surface active agent composed of the four components (a) through (d), agitating the mixture well, and admixing the mixture with brine. In this connection, in case where crude petroleum is used as the hydrocarbon, heating may be required in order to facilitate solubilization of the petroleum. If the micelle solution which has been produced by application of heat is returned to a normal temperature, liquid separation or formation of precipitate is not usually observed. Thus, such a solution is convenient for use at a normal temperature.

The micelle solution has the advantage that suitable choice of component (a) with respect to the type, e.g. polyol, polyamine or aminoalcohol, the content of ethylene oxide in the molecule, and the molecular weight of the component, is responsible for a wide salt concentration in brine ranging from a very low concentration of 0.01% to a high concentration over 20%.

Moreover, the micelle solution of the invention has another advantage that a stable salt concentration suffers little changes depending on the type of hydrocarbon. This is convenient for the preparation of the micelle solution since the solution is kept stable irrespective of the type of hydrocarbon or even when the nature of hydrocarbon is changed. The micelle solution is stable not only at a normal temperature, but also under relatively high temperature conditions. In particular, the solution is usable at a temperature up to a cloud point of component (d). Accordingly, the micelle solution can be used in oil reservoirs of relatively high temperatures for practical recovery of crude oil, so that the recovery efficiency of crude oil can be raised.

Further, since the micelle solution has a low viscosity at a normal temperature and a high viscosity at a high temperature, it is easy to handle in an injection plant, and it shows a good sweep efficiency in oil reservoirs.

The surface active agent used in the micelle solution of the invention is a mixture of (a) through (d), of which component (b) should be alkaline earth metal salts of alkylbenzenesulfonic acid. With alkali metal or ammonium salts, stable emulsions cannot be obtained. Component (c) should have a chemical structure of the formula, $-O(CH_2CH_2O)_nSO_3-$. Little or no effect is produced when using alkyl benzenesulfonates or alkyl sulfates. Component (d) is a nonionic surface active agent having polyoxyethylene chains. The nonionic surface active agent can be designed to be optimum for an intended micelle solution by appropriate control in size of the polyoxyethylene chain.

The mixing ratios of these components are preferably determined in the following ranges based on 1 mole of component (a). Component (b) is preferably in the range of 2 to 80 moles, and smaller amounts are unfavorable because no micelle solution is formed. Larger amounts result in liquid separation or formation of precipitate. More preferably, it is in the range of 10 to 60 moles.

Component (c) is preferably in the range of 5 to 30 moles. Smaller amounts result in liquid separation and formation of precipitate, whereas larger amounts are unfavorable because no micelle solution is formed. More preferably, the amount is in the range of 8 to 10 moles.

Component (d) is preferably in the range of 40 to 120 moles. With smaller amounts, no micelle solution is formed, whereas larger amounts are disadvantageous in that the resulting solution does not stand use when applied to brine of high temperatures and high concentrations. More preferably, component (d) is used in the range of 60 to 90 moles.

Compounds of component (a) may be mixed within ranges where micelle solutions obtained from the respective compounds are kept stable when mixed together.

Compounds of component (b) or (c) may be used singly or in combination. When used in combination, a part of one compound may be replaced by an equimolar amount of another.

In order to carry out the present invention, it is frequently necessary to use a mixture of compounds serving as component (d). Where use of one compound as component (d) leads to a deficiency in hydrophilic or oleophilic property, this deficiency is overcome by mixing with another type of compound serving as component (d).

The hydrocarbons used in the practice of the invention may be any ordinarily employed hydrocarbons such as, for example, crude petroleum, fractions, synthetic petroleum, or mixtures thereof. Examples of brine include aqueous inorganic salt solutions, sea water, ordinary well water, or mixtures thereof. The brine should have a total dissolved solid content ranging from 0.01 to 21 wt %.

For the micro emulsion flooding, the viscosity of micelle solution gives a great influence on the recovery, so that it is usual to adjust the viscosity so as to control a mobility of the solution. For the micelle solution of the invention, there can be used as a viscosity adjuster aqueous solutions of polymers such as polacrylamide, polysaccharides and the like.

The micelle solution of the invention preferably comprises 0.2 to 30 wt % of a hydrocarbon, 50 to 96 wt % of brine, and 4 to 50 wt % of a mixture of surface active agents. Aside from these components, ordinarily employed arbitrary ingredients including, for example, lower alcohols such as methanol, ethanol, isopropyl alcohol, and the like, aromatic hydrocarbons such as benzene, toluene, xylene, ethylbenzene, dodecylbenzene, and the like, and other hydrocarbons may be added to the micelle solution. For instance, calcium alkylbenzenesulfonate is used as its methanolic solution.

The micelle solution of the invention is usable, for example, in washing out the residual oils of wells and their vicinities.

The present invention is illustrated by way of examples, which should not be construed as limiting the present invention thereto.

EXAMPLE 1

Kerosene was admixed with each of mixtures of surface active agents having compositions indicated in Table 1 under agitation, followed by dissolving in brine to determine a range of salt concentration in brine where the resulting micelle solution was stable. The results are shown in Table 2 where the stable range is marked as "o".

Component (a) is designated as S—which is followed by the number of the third or higher order of the molecular weight and the number of weight percent of added ethylene oxide. For instance, component (a) having a molecular weight of 4200 and an added ethylene oxide content of 26% is designated as S-4226. The name of component (a) used in examples of the present invention is hereinafter expressed in a manner as illustrated above.

Compounds used as component (a) of Table 1 are shown below.

Block polymers obtained by adding ethylene oxide to polypropylene glycol: S-2010, S-2220, S-3330, S-3040, S-4143, S-6250, S-5861, S-3968.

Block polymers obtained by adding propylene oxide and ethylene oxide to pentaerythritol: S-4310, S-5820, S-4840.

Block polymers obtained by adding propylene oxide and ethylene oxide to diethanolamine: S-4226.

Block polymers obtained by adding propylene oxide and ethylene oxide to sucrose: S-5029.

Component (b) used was a methanol solution of 70% calcium dodecylbenzenesulfonate (hereinafter referred to simply as DBC) which is available under the name of Neopelex C-70, by Kao Corporation). In Table 1, this is abbreviated as C-70.

As component (c), there was used an aqueous 25% solution of sodium polyoxyethylene (n=3) lauryl ether sulfate (Emal 20C, by Kao Corporation), or an aqueous 25% solution of sodium polyoxyethylene (n=17) lauryl ether sulfate (Levenol WX, by Kao Corporation). In Table 1, these solutions are abbreviated as 20C and WX, respectively.

Component (d) used was polyoxyethylene ($\bar{P}=11$) nonyl phenol ether (Emulgen 911, by Kao Corporation), polyoxyethylene ($\bar{P}=13$) nonyl phenol ether (Emulgen 913, by Kao Corporation), or polyoxyethylene ($\bar{P}=20$) nonyl phenol ether (Emulgen 920, Kao Corporation). In Table 1, these compounds are, respectively, abbreviated as E-911, E-913 and E-920.

Mixing ratios of components (a), (b), (c) and (d) are as shown in Table 1. From Table 1, it will be seen that Neopelex C-70 was used as component (b) in amounts of 10 and 20 moles calculated as DBC. Also, it is shown that Emal 20C or Levenol WX was used as component (c) in an amount of 9 moles as the salt.

0.5 g of kerosene was added, under agitation, to 10 g of each of surface active agents having compositions indicated in Table 1, to which was added 100 ml of brine for dissolution to give a micelle solution. As brine were used NaCl solutions having salt concentrations increased by steps of 1%. Micelle solutions at different salt concentrations were prepared to determine their stability at a normal temperature. The results are shown in Table 2, in which by the mark "o" is meant good stability, by "Δ" is unstability, and by "x" is complete separation. The term "unstability" is intended to mean the state where separation takes place after 24 hours or more.

It will be noted that abbreviated names of component (a) following "M" in Table 2 mean use of mixtures of components (a), (b), (c) and (d), and kerosene.

TABLE 1

| | Components | | |
|---|---|---|---|
| (a) (1 mole) | (b) (C-70) | (c) (9 mole) | (d) (80 moles) |
| S-2010 | 20 moles | 20C | E-911 |
| S-2220 | 20 moles | 20C | E-911 |
| S-3330 | 20 moles | 20C | E-911 |
| S-3040 | 20 moles | 20C | E-913 |
| S-4143 | 20 moles | 20C | E-920 |
| S-6250 | 10 moles | 20C | E-920 |
| S-5861 | 10 moles | WX | E-920 |
| S-3968 | 10 moles | WX | E-920 |
| S-4310 | 20 moles | 20C | E-911 |
| S-5820 | 20 moles | 20C | E-911 |
| S-4840 | 20 moles | 20C | E-911 |
| S-4226 | 20 moles | 20C | E-911 |
| S-5029 | 20 moles | 20C | E-911 |

TABLE 2

| % Mixture | Salt Concentration (%) | | | | | | | | | | | | | | | | | | | | | |
|---|---|---|---|---|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 17 | 18 | 19 | 20 | 21 | 22 |
| MS-2010 | | x | o | o | x | | | | | | | | | | | | | | | | | |
| MS-2220 | | | x | o | o | x | | | | | | | | | | | | | | | | |
| MS-3330 | | | | x | o | o | o | x | | | | | | | | | | | | | | |
| MS-3040 | | | | | | x | o | o | o | x | | | | | | | | | | | | |
| MS-4143 | | | | | | | | x | o | o | o | o | x | | | | | | | | | |
| MS-6250 | | | | | | | | | | | x | o | o | x | | | | | | | | |
| MS-5861 | | | | | | | | | | | | | | x | o | o | o | o | x | | | |
| MS-3968 | | | | | | | | | | | | | | | | | x | Δ | o | o | Δ | x |
| MS-4310 | o | o | x | | | | | | | | | | | | | | | | | | | |
| MS-5820 | x | o | o | o | o | x | | | | | | | | | | | | | | | | |
| MS-4840 | | | | x | o | o | o | x | | | | | | | | | | | | | | |
| MS-4226 | | x | o | o | x | | | | | | | | | | | | | | | | | |
| MS-5029 | | x | o | o | x | | | | | | | | | | | | | | | | | |

EXAMPLE 2

40 g of a surface active agent having a composition indicated in Table 3 was admixed with 2 g of crude oil from Kubiki (specific gravity 0.886) and 20 g of the mixture was dissolved in 100 ml of 4% NaCl solution. As a result, a transparent micelle solution was obtained.

TABLE 3

| Component (a) | S-5820 | 2.4 g |
|---|---|---|
| Component (b) | Neopelex C-70 | 8.2 |
| Component (c) | Emal 20C | 6.3 |

TABLE 3-continued

| Component (d) | Emulgen 911 | 23.1 |
|---|---|---|

EXAMPLE 3

40 g of a surface active agent having a composition indicated in Table 4 was admixed with 6 g of Kubiki crude oil under agitation and 20 g of the mixture was dissolved in 100 ml of 4% NaCl solution. As a result, a transparent micelle solution was obtained and was stable up to a temperature of 72° C. This temperature was near the cloud point 74° C. of Emulgen 911.

TABLE 4

| Component (a) | S-5029 | 2.0 g |
|---|---|---|
| Component (b) | Neopelex C-70 | 9.2 |
| Component (c) | Emal 20C | 6.1 |
| Component (d) | Emulgen 911 | 22.7 |

EXAMPLE 4

Compositions deficient of one or two components of the composition of Table 4 were used to determine the stability of micelle solutions produced therefrom. The amounts of the respective components used were the same as those in Table 4, and an amount of crude petroleum and that of the mixture dissolved in 4% NaCl solution were maintained at constant levels. The results are shown in Table 5 below.

TABLE 5

| No. | 1 | 2 | 3 | 4 | 5 | 6 | 7 | 8 | 9 | 10 | 11 |
|---|---|---|---|---|---|---|---|---|---|---|---|
| Comp. (a) S-5029 (g) | 0.5 | — | 0.6 | 0.6 | 1.2 | — | — | — | 0.8 | 2.5 | 1.8 |
| Comp. (b) Neopelex (g) C-70 | 2.3 | 2.4 | — | 2.7 | 5.3 | — | 2.9 | 6.1 | — | — | 8.2 |
| Comp. (c) Emal 20 C (g) | 1.5 | 1.6 | 1.9 | — | 3.5 | 2.1 | — | 3.9 | — | 7.5 | — |
| Comp. (d) Emulgen 911 (g) | 5.7 | 6.0 | 7.4 | 6.7 | — | 7.9 | 7.1 | — | 9.2 | — | — |
| Crude Petroleum (g) | 1.5 | 1.5 | 1.5 | 1.5 | 1.5 | 1.5 | 1.5 | 1.5 | 1.5 | 1.5 | 1.5 |
| Brine (ml) | 100 | 100 | 100 | 100 | 100 | 100 | 100 | 100 | 100 | 100 | 100 |
| Results | o | Δ | Δ | x | Δ | Δ | x | x | Δ | Δ | x | o; Stable,
Δ; Unstable,
x; complete separation

EXAMPLE 5

40 g of a surface active agent having a composition indicated in Table 4 was admixed with 6 g of Kubiki crude oil under agitation, and 20 g of the mixture was dissolved in 100 ml of sea water. The resulting transparant micelle solution was stable up to a temperature of 72° C. similar to the results of Example 3.

The recovery of crude oil was measured as follows using the micelle solution.

A core having an outer diameter of 38.1 mm (1.5 inches) and a length of 28 cm was made using Berea sandstone. The core hand a pore volume of 53.2 ml and a porosity of 18.4%.

The core was filled with sea water in the pores thereof and was set in a core flooding test device. The operating temperature was set at 50° C.

Thereafter, Kubiki crude oil was passed from one side of the core along the axis thereof and amounts of the sea water and the crude oil discharged from the other side were measured. At the time when no sea water was flown, an amount of the crude oil in the core was found to be 38.0 ml.

Then, sea water was passed to effect the so-called water flooding. The amount of recovered crude oil by the water flooding was 19.5 ml and an amount of the residual oil in the core was 18.5 ml.

Thereafter, 27 ml of the micelle solution (corresponding to half the pore volume) was passed, followed by sea water until no crude oil was caused to flow. Amount of recovered crude oil was 13.1 ml and a recovery to the residual oil in the core was found to be 70.8%.

EXAMPLE 6

20 g of a surface active agent having a composition indicated in Table 6 was admixed with 2 g of Kubiki crude oil under agitation, and 20 g of the mixture was dissolved in 100 ml of 8% NaCl solution.

As a result, a transparent micelle solution was obtained which was stable even at 50° C.

TABLE 6

| Component (a) | S-3040 | 0.6 g |
|---|---|---|
| Component (b) | Neopelex C-70 | 4.2 |
| Component (c) | Emal 20C | 2.9 |
| Component (d) | Emulgen 913 | 12.3 |

EXAMPLE 7

20 g of a surface active agent having a composition indicated in Table 7 was admixed with 2 g of Kubiki crude oil under agitation, and 20 g of the mixture was dissolved in 100 ml of 12% NaCl solution.

The resulting transparent micelle solution was stable at 50° C.

TABLE 7

| Component (a) | S-4143 | 0.7 g |
|---|---|---|
| Component (b) | Neopelex C-70 | 3.6 |
| Component (c) | Emal 20C | 2.6 |
| Component (d) | Emulgen 920 | 13.1 |

EXAMPLE 8

20 g of a surface active agent having a composition indicated in Table 8 was admixed with 2 g of Kubiki crude oil under agitation, and 20 g of the mixture was dissolved in 100 ml of 16% NaCl solution. As a result, a transparent micelle solution was obtained and was stable even at 50° C.

The crude oil recovery test was effected in the same manner as in Example 5 using the micelle solution and 16% NaCl solution, with the result that the recovery was 62%.

TABLE 8

| Component (a) | S-5861 | 0.9 g |
|---|---|---|
| Component (b) | Neopelex C-70 | 1.5 |
| Component (c) | Levenol WX | 5.7 |
| Component (d) | Emulgen 920 | 11.9 |

EXAMPLE 9

20 g of a surface active agent having a composition indicated in Table 9 was admixed with 2 g of Kubiki crude oil under agitation, and 20 g of the mixture was dissolved in 100 ml of 16% NaCl solution. As a result, a transparent micelle solution was obtained and was stable even at 50° C. It will be noted that Emal NC used is an aqueous 25% solution of sodium polyoxyethylene (n=3) nonyl phenol ether sulfate, product of Kao Corporation.

TABLE 9

| Component (a) | S-5861      | 1.1 g |
|---------------|-------------|-------|
| Component (b) | Neopelex C-70 | 1.8   |
| Component (c) | Emal NC     | 3.0   |
| Component (d) | Emulgen 920 | 14.1  |

EXAMPLE 10

20 g of a surface active agent having a composition indicated in Table 10 was admixed with 2 g of Kubiki crude oil under agitation, and 20 g of the mixture was dissolved in 100 ml of 20% NaCl solution. The resulting micelle solution was transparent at a normal temperature but separated into two liquid phases at 50° C.

The salt concentration of brine which permitted the surface active agent having the composition of Table 10 to form a stable micelle solution at 50° C. was 15 and 16%.

TABLE 10

| Component (a) | S-3968      | 0.6 g |
|---------------|-------------|-------|
| Component (b) | Neopelex C-70 | 1.5   |
| Component (c) | Levenol WX  | 5.8   |
| Component (d) | Emulgen 920 | 12.1  |

EXAMPLE 11

20 g of a surface active agent having a composition indicated in Table 11 was admixed with 12 g of Kubiki crude oil, and 30 g of the mixture was dissolved in 100 ml of sea water. As a result, no transparent micelle solution was formed at a normal temperature and it was necessary to heat the mixture at temperatures over 40° C. Once formed, the micelle solution was transparent and stable at a normal temperature.

The micelle solution was used to effect the crude oil recovery test in the same manner as in Example 5, with the result that the recovery was 66%.

TABLE 11

| Component (a) | S-5029      | 0.7 g |
|---------------|-------------|-------|
| Component (b) | Neopelex C-70 | 8.6   |
| Component (c) | Emal 20C    | 2.5   |
| Component (d) | Emulgen 911 | 8.2   |

EXAMPLE 12

20 g of a surface agent having a composition indicated in Table 12 was admixed with 3 g of Kubiki crude oil under agitation, and 20 g of the mixture was dissolved in 100 ml of sea water.

The resulting micelle solution was so unstable that it could not be used in practical applications. It will be noted that Neopelex F-65 is an aqueous 65% solution of sodium dodecylbenzenesulfonate, product of Kao Corporation.

TABLE 12

| Component (a) | S-5029      | 1.0 g |
|---------------|-------------|-------|
| Component (b) | Neopelex F-65 | 4.9   |
| Component (c) | Emal 20C    | 3.0   |
| Component (d) | Emulgen 911 | 11.1  |

EXAMPLE 13

20 g of a surface active agent having a composition indicated in Table 13 was admixed with 12 g of Kubiki crude oil under agitation, and 20 g of the mixture was dissolved in 100 ml of sea water. As a result, a transparent micelle solution was obtained. It will be noted that Emulgen 320 P is polyoxyethylene (n=20) stearyl ether, product of Kao Corporation.

TABLE 13

| Component (a) | S-5029       | 0.6 g |
|---------------|--------------|-------|
| Component (b) | Neopelex C-70 | 6.9   |
| Component (c) | Emal 20C     | 1.9   |
| Component (d) | Emulgen 320P | 10.6  |

EXAMPLE 14

The micelle solution of Example 2 and the micelle solution of Example 3 were mixed together. In any mixing ratios, the resulting mixtures were found to be transparent micelle solutions.

EXAMPLE 15

The micelle solutions of Examples 8 and 9 were mixed together. In any mixing ratios, the resulting mixtures were found to be transparent micelle solutions.

What is claimed is:

1. A micelle solution composition for recovering crude oil from petroleum reservoirs which comprises as essential components, a hydrocarbon, brine, and a surface active agent, wherein said surface active agent is a mixture of (a) an ethylene oxide and propylene oxide block polymer, (b) an alkaline earth metal salt of an alkylbenzenesulfonate, (c) a polyoxyethylene alkyl ether sulfate or polyoxyethylene alkylphenol ether sulfate, and (d) a polyoxyethylene nonionic surface active agent other than the agent specified in (a).

2. The micelle solution composition according to claim 1, wherein said ethylene oxide and propylene oxide block polymer of component (a) is a propylene oxide and ethylene oxide adduct of a polyol, polyamine or an amino-alcohol.

3. The micelle solution composition according to claim 1, wherein component (b) is an alkaline earth metal salt of an alkylbenzenesulfonic acid which has a linear or branched alkyl group containing from 8 to 20 carbon atoms.

4. The micelle solution composition according to claim 1, wherein component (c) is a polyoxyethylene alkyl ether sulfate or polyoxyethylene alkylphenol ether sulfate represented by the following formula:

$$R-O(CH_2CH_2O)_n-SO_3 \cdot X$$

in which R represents an alkyl group having 8 to 22 carbon atoms or a phenyl group with an alkyl group substituent having 4 to 18 carbon atoms, n is a value ranging from 2 to 100 on average, and X represents an alkali metal, or an ammonium or triethanolammonium radical.

5. The micelle solution composition according to claim 1, wherein component (d) is a polyoxyethylene alkyl ether or polyoxyethylene alkylphenol ether nonionic surface active agent.

6. The micelle solution composition according to claim 1, wherein said surface active agent essentially consists of component (a), 2 to 80 moles of component (b), 5 to 30 moles of component (c), and 40 to 120 moles of component (d) each based on one mole of component (a).

7. The micelle solution composition according to claim 1, wherein said hydrocarbon is crude oil, petroleum fraction, or synthetic petroleum.

8. The micelle solution composition according to claim 1, wherein said brine has a total dissolved solid content of 0.01 to 21 wt % and is an aqueous inorganic salt solution, sea water, general well water, or mixtures thereof.

9. The micelle solution composition according to any of the claims 1 through 8, comprising 0.2 to 30 wt % of the hydrocarbon, 50 to 96 wt % of the brine, and 4 to 50 wt % of the surface active agent.

10. The micelle solution composition according to claim 1, wherein said ethylene oxide and propylene oxide block polymer is an adduct of 20 to 100 moles of ethylene oxide and propylene oxide as a block per one unit of active hydrogen.

11. The micelle solution composition according to claim 1, wherein said ethylene oxide content is in the range of 10 to 75 wt % of the total weight.

12. The micelle solution composition according to claim 1, wherein said polyoxyethylene nonionic surface active agent is selected from the group of a polyethylene alkyl ether having an average number of addition moles of ethylene oxide ranging from 2 to 100 with the number of carbon atoms in the alkyl moiety ranging from 8 to 22, and being described as POE ($\bar{P}=2$ to 100) alkyl (C=8 to 22) ether; and, using the same notation, other members of the group are POE ($\bar{P}2$ to 100) alkyl (C=4 to 18) phenol ether, fatty acid (C=8 to 22) POE adducts ($\bar{P}=2$ to 100), POE ($\bar{P}=2$ to 100) alkyl (C=8 to 22) amines, POE ($\bar{P}=3$ to 100) sorbitan fatty acid (C=8 to 22) ester, and POE ($\bar{P}=2$ to 100) fatty acid (C=8 to 22) amides.

13. The micelle solution composition according to claim 12, wherein said polyoxyethylene nonionic surface active agent is polyoxyethylene ($\bar{P}=5$ to 10) nonyl phenol ether.

14. The micelle solution composition according to claim 1, wherein said alkaline earth metal salt of an alkylbenzenesulfonate is calcium alkylbenzenesulfonate.

* * * * *